(12) United States Patent
D'Sidocky et al.

(10) Patent No.: US 6,371,181 B2
(45) Date of Patent: Apr. 16, 2002

(54) HALOGENATED ISOBUTYLENE RUBBER COMPOSITION CONTAINING SODIUM THIOSULFATE PENTAHYDRATE

(75) Inventors: Richard Michael D'Sidocky, Ravenna; Bernard Matthew Bezilla, Jr., Stow; Leighton Randolph Spadone, South Euclid; David Michael Smith, Sr., Wadsworth; Mark Andrew Marinko, Stow, all of OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 09/884,308

(22) Filed: Jun. 19, 2001

Related U.S. Application Data

(62) Division of application No. 09/350,557, filed on Jul. 9, 1999, now Pat. No. 6,291,595, which is a continuation of application No. 08/885,573, filed on Jun. 30, 1997, now abandoned.

(51) Int. Cl.$^7$ ............................. B60C 5/02; B60C 5/14
(52) U.S. Cl. ...................................................... 152/510
(58) Field of Search .......................................... 152/510

(56) References Cited

U.S. PATENT DOCUMENTS

| 5,594,052 A | | 1/1997 | D'Sidocky | 524/83 |
| 5,616,655 A | | 4/1997 | D'Sidocky | 525/342 |
| 5,922,153 A | * | 7/1999 | Beers | 152/510 |

* cited by examiner

*Primary Examiner*—Christopher Henderson
(74) *Attorney, Agent, or Firm*—Bruce J. Hendricks

(57) ABSTRACT

A method is disclosed for increasing the rate of vulcanization of a halogenated isobutylene sulfur rubber composition comprising heating said halogenated isobutylene rubber composition to a temperature ranging from 100° C. to 200° C., wherein said halogenated isobutylene rubber composition contains from 0.05 to 10 phr of sodium thiosulfate pentahydrate.

1 Claim, No Drawings

HALOGENATED ISOBUTYLENE RUBBER COMPOSITION CONTAINING SODIUM THIOSULFATE PENTAHYDRATE

This is a Divisional of application Ser. No. 09/350,557, filed on Jul. 9, 1999, now U.S. Pat. No. 6,291,595', which is a Continuation application of Ser. No. 08/885,573, filed Jun. 30, 1997, now abandoned.

FILED OF THE INVENTION

The present invention relates to increasing the rate of vulcanization of a halogenated isobutylene rubber composition.

BACKGROUND OF THE INVENTION

The "rate of cure" is defined as the rate at which crosslinking and the development of the stiffness (modulus) of a rubber compound occurs. As the rubber compound is heated, the properties of the rubber compound change from a soft plastic to a tough elastic material. During the curing step, crosslinks are introduced, which connect the long polymer chains of the rubber. As more crosslinks are introduced, the polymer chains become more firmly connected and the stiffness or modulus of the compound increases. The rate of cure is an important vulcanization parameter since it in part determines the time the compound must be cured, i.e., the "cure time". In the manufacture of vulcanized rubber articles, significant cost savings can be realized through a reduction of cure time. Through enhanced rates of cure, the cure time required to meet minimum states of cure can be reduced. Given the above, extensive research has been conducted in order to shorten the cure times of rubbers. Therefore, there exists a need for improved methods which enhance the rate of cure in the absence of imparting undesirable properties to the vulcanizate.

SUMMARY OF THE INVENTION

The present invention relates to the use of a sodium thiosulfate pentahydrate in a halogenated isobutylene rubber composition.

DETAILED DESCRIPTION OF THE INVENTION

There is disclosed a method for increasing the rate of vulcanization of a halogenated isobutylene rubber composition by heating said halogenated isobutylene rubber composition to a temperature ranging from 100° C. to 200° C. wherein said halogenated isobutylene rubber composition contains from 0.05 to 10 phr of sodium thiosulfate pentahydrate.

There is also disclosed a halogenated isobutylene rubber composition comprising (a) a halogenated isobutylene rubber and
(b) from 0.05 to 10 phr of a sodium thiosulfate pentahydrate.

The present invention relates to halogenated isobutylene rubber. By the term "halogenated isobutylene rubber" is meant a halogenated polymer comprising isobutylene subunits. Halogens include chlorine and bromine, with bromine being preferred. The halogenated rubbers used in this invention include polymers bearing halogen atoms incorporated before or after polymerization.

The halogenated isobutylene rubbers used in this invention include, but are not limited to, brominated butyl rubber (commonly called bromobutyl and abbreviated BIIR where isoprene is the diene copolymerized with isobutylene; as used herein, the term "butyl rubber" means a copolymer of isobutylene and a diene such as isoprene); chlorinated butyl rubber (commonly called chlorobutyl and abbreviated CIIR where isoprene is the diene copolymerized with isobutylene); so-called star-branched polyisobutylene comprising branched or star-shaped polyisobutylene subunits, such as star-branched bromobutyl and star-branched chlorobutyl; isobutylene-bromomethylstyrene copolymers such as isobutylene/meta-bromomethylstyrene and isobutylene/para-bromomethylstyrene, isobutylene/chloromethylstyrene copolymers such as isobutylene/meta-chloromethylstyrene and isobutylene/parachloromethylstyrene, and the like, including and mixtures thereof.

The halogenated isobutylene rubbers also include halogenated isobutylene containing terpolymers, such as halogenated isobutylene/styrene/dienes; eg, isobutylene/styrene/isoprene and halogenated isobutylene/methylstyrene/dienes; eg, isobutylenelmethylstyrene/isoprene; isobutylene/halomethylstyrene/diene terpolymers including isobutylene/bromomethylstyrene/isoprene; isobutylene/haloisobutylene/dienes, including isobutylene/bromobutylene/isoprene; and the like, and mixtures thereof with other halogenated isobutylene rubbers.

The halogenated isobutylene rubber compositions of the present invention contain a majority level of a halogenated isobutylene rubber. Namely, of 100 parts by weight of total rubber in the overall composition, no less than 50 parts by weight of the halogenated isobutylene rubber per 100 parts by weight of total rubber (phr) should be used. Preferably, from 75 to 100 phr of halogenated isobutylene rubber is present.

In those instances where 100 parts by weight of halogenated isobutylene rubber is not used, other rubbers or elastomers containing olefinic unsaturation may be used in minor amounts (less than 50 parts by weight). Such rubbers or elastomers include butyl rubber, natural rubber, styrene-butadiene copolymer rubber, synthetic polyisoprene and polybutadiene.

The term "phr" as used herein, and according to conventional practice, refers to "parts by weight of a respective material per 100 parts by weight of rubber, or elastomer".

An essential component of the present invention is the sodium thiosulfate pentahydrate. The sodium thiosulfate pentahydrate used in the present invention may be added to the rubber by any conventional technique such as on a mill or in a Banbury. The amount of sodium thiosulfate pentahydrate may vary widely depending on the type of rubber and other compounds present in the vulcanizable composition. Generally, the amount of sodium thiosulfate pentahydrate is used in a range of from about 0.05 to about 10.0 phr with a range of 0.1 to about 5.0 phr being preferred.

For ease in handling, the sodium thiosulfate pentahydrate salt may be used per se or may be deposited on suitable carriers. Examples of carriers which may be used in the present invention include silica, carbon black, alumina, kieselguhr, silica gel and calcium silicate.

The vulcanization of the halogenated isobutylene rubber composition is conducted after a sulfur vulcanizing agent has been intimately dispersed in the composition. Examples of suitable sulfur vulcanizing agents include elemental sulfur (free sulfur), an amine disulfide, polymeric polysulfide or sulfur olefin adducts. Preferably, the sulfur vulcanizing agent is elemental sulfur. The sulfur vulcanizing agent may be used in an amount ranging from 0.1 to 8 phr, with a range of from 0.5 to 5.0 being preferred.

It is readily understood by those having skill in the art that the rubber composition would be compounded by methods generally known in the rubber compounding art, such as mixing the rubbers with various commonly used additive materials such as, for example, curing aids, activators, retarders, processing oils, resins, tackifying resins, plasticizers, fillers, pigments, fatty acids, zinc oxide, magnesium oxide, waxes, antioxidants, antiozonants and peptizing agents. As known to those skilled in the art, depending on the intended use of the halogenated isobutylene rubber composition, the additives mentioned above are selected and commonly used in conventional amounts. Typical amounts of reinforcing-type carbon blacks(s), comprise about 30 to 150 phr. Representative examples of such carbon blacks include N110, N121, N220, N231, N234, N242, N293, N299, N330, N339, N343, N347, N351, N358, N375, N660, N683, N754, N762, N765, N774, N907, N908, N990 and N991. Typical amounts of resins comprise about 0.5 to about 10 phr, usually about 1 to about 5 phr. Representative examples of such resins include phenolformaldehyde resins, hydrocarbon resins and coumaroneindene resins. Typical amounts of processing oils comprise about 1 to about 50 phr. Such processing oils can include, for example, aromatic, napthenic, and/or paraffinic processing oils. Typical amounts of antioxidants comprise about 1 to about 5 phr. Representative antioxidants may be, for example, diphenyl-p-phenylenediamine and others, such as, for example, those disclosed in the *Vanderbilt Rubber Handbook* (1978), pages 344–346. Typical amounts of antiozonants comprise about 1 to 5 phr. Typical amounts of fatty acids (such as stearic acid and oleic acid) are used in an amount ranging from about 0.2 to about 3 phr. Typical amounts of zinc oxide comprise about 0.5 to about 5 phr. Typical amounts of magnesium oxide ranges from 0 to 1.0 phr. Typical amounts of waxes comprise about 1 to about 5 phr. Often microcrystalline waxes are used. Typical amounts of peptizers comprise about 0.1 to about 1 phr. Typical peptizers may be, for example, pentachlorothiophenol and dibenzamidodiphenyl disulfide.

Accelerators may be used to control the time and/or temperature required for vulcanization and to improve the properties of the vulcanizate. In general, from 0.1 to 3 phr of total accelerator(s) is used. Preferably, from 0.2 to 2 phr is used. In one embodiment, only a primary accelerator may be used. In another embodiment, combinations of a primary and a secondary accelerator might be used with the secondary accelerator being used in smaller amounts (of about 0.05 to about 1.0 phr) in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are sulfenamides, amines, disulfides, guanidines, thioureas, thiazoles, thiurams, dithiocarbamates, xanthates and mixtures thereof. If a second accelerator is used, the secondary accelerator is preferably a guanidine, dithiocarbamate or thiuram compound.

The mixing of the rubber composition can be accomplished by methods known to those having skill in the rubber mixing art. For example the ingredients are typically mixed in at least two stages, namely at least one non-productive stage followed by a productive mix stage. The final curatives including sulfur vulcanizing agents and accelerators are typically mixed in the final stage which is conventionally called the "productive" mix stage in which the mixing typically occurs at a temperature, or ultimate temperature, lower than the mix temperature(s) of the preceding non-productive mix stage(s). The rubber and carbon black, if used, may be mixed in one or more non-productive mix stages. Preferably, the sodium thiosulfate pentahydrate is added during the nonproductive stage of mixing. The terms "non-productive" and "productive" mix stages are well known to those having skill in the rubber mixing art.

In one aspect of the present invention, the halogenated isobutylene rubber composition is then sulfur-cured or vulcanized.

Vulcanization of the rubber composition of the present invention is generally carried out at conventional temperatures ranging from about 100° C. to 200° C. Preferably, the vulcanization is conducted at temperatures ranging from about 110° C. to 180° C. Any of the usual vulcanization processes may be used such as heating in a press or mold, heating with superheated steam or hot air or in a salt bath.

Upon vulcanization of the sulfur vulcanizable composition at a temperature ranging from 100° C. to 200° C., the halogenated isobutylene rubber composition of this invention can be used for various purposes. For example, the halogenated isobutylene rubber composition may be in the form of a tire. In the case of a tire, it can be used for various tire components and especially in sidewalls and as an innerliner. Such tires can be built, shaped, molded and cured by various methods which are known and will be readily apparent to those having skill in such art. Preferably, the rubber composition is used in the innerliner of a tire. As can be appreciated, the tire may be a passenger tire, aircraft tire, truck tire and the like. Preferably, the tire is a passenger tire. The tire may also be a radial or bias, with a radial tire being preferred.

The invention may be better understood by reference to the following examples in which the parts and percentages are by weight unless otherwise indicated.

The following examples are presented in order to illustrate but not limit the present invention.

Cure properties were determined using a Monsanto oscillating disc rheometer which was operated at a temperature of 150° C. and at a frequency of 11 hertz. A description of oscillating disc rheometers can be found in the Vanderbilt Rubber Handbook edited by Robert O. Ohm (Norwalk, Conn., R. T. Vanderbilt Company, Inc., 1990), pages 554–557. The use of this cure meter and standardized values read from the curve are specified in ASTM D-2084. A typical cure curve obtained on an oscillating disc rheometer is shown on page 555 of the 1990 edition of the Vanderbilt Rubber Handbook.

In such an oscillating disc rheometer, compounded rubber samples are subjected to an oscillating shearing action of constant amplitude. The torque of the oscillating disc embedded in the stock that is being tested that is required to oscillate the rotor at the vulcanization temperature is measured. The values obtained using this cure test are very significant since changes in the rubber or the compounding recipe are very readily detected. It is obvious that it is normally advantageous to have a fast cure rate.

"Rate" in Table II is defined according to the following formula:

$$\frac{T90 \text{ (torque)} - T1 \text{ pt rise (torque)}}{T90 \text{ (min)} - T1 \text{ pt (min)}}$$

EXAMPLE 1

The formulation set out in Table 1 was utilized for all the examples unless otherwise stated. The various additives were compounded using conventional rubber compounding techniques and the samples vulcanized by compression molding methods for 18 minutes at 150° C. unless otherwise stated.

TABLE I

| Sample No. | Control 1 | 2 | 3 | 4 | 5 | Control 6 | 7 |
|---|---|---|---|---|---|---|---|
| Nonproductive | | | | | | | |
| Bromobutyl Rubber[1] | 100 | 100 | 100 | 100 | 100 | 100 | 100 |
| Carbon Black[2] | 50 | 50 | 50 | 50 | 50 | 50 | 50 |
| Processing Oils | 5 | 5 | 5 | 5 | 5 | 5 | 5 |
| Resins[3] | 12 | 12 | 12 | 12 | 12 | 12 | 12 |
| Stearic Acid | 2 | 2 | 2 | 2 | 2 | 2 | 2 |
| Sodium Thiosulfate Pentahydrate | 0 | 0 | 1 | 0 | 1 | 0 | 1 |
| Productive | | | | | | | |
| Nonproductive | 169 | 169 | 170 | 169 | 170 | 169 | 170 |
| Zinc Oxide | 1 | 1 | 1 | 1 | 1 | 1 | 1 |
| Sulfur | 0.5 | 0.5 | 0.5 | 0.5 | 0.5 | 0.5 | 0.5 |
| Mercaptobenzothiazole disulfide | 0 | 0 | 0 | 0 | 0 | 1.25 | 1.25 |
| Tetramethylthiuram disulfide | 0.2 | 0.2 | 0.2 | 0 | 0 | 0 | 0 |
| Sodium Thiosulfate Pentahydrate | 0 | 1 | 0 | 1 | 0 | 0 | 0 |
| N-cyclohexyl-benzothiazole 2-sulfenamide | 0 | 0 | 0 | 0.5 | 0.5 | 0 | 0 |

[1]Commercially available from Exxon under the designation bromobutyl 2222.
[2]N660
[3]Blend of Phenol-Formaldehyde and hydrocarbon resins In this example, sodium thiosulfate pentahydrate is evaluated as a cure activator which can be used to beneficially reduce cure times without sacrificing cured physical properties of the halogenated isobutylene rubber composition. The rubber compositions are identified herein as Samples 1–7 of Table 2 with Samples 1 and 6 acting as the control compounds containing no sodium thiosulfate pentahydrate, and Samples 2, 3, 4, 5 and 7 utilizing sodium thiosulfate pentahydrate with varying accelerators. The physical data for each sample appears in Table II.

TABLE II

| Sample No. | Control 1 | 2 | 3 | 4 | 5 | Control 6 | 7 |
|---|---|---|---|---|---|---|---|
| Mercaptobenzothiazole disulfide | 0 | 0 | 0 | 0 | 0 | 1.25 | 1.25 |
| Tetramethylthiuram disulfide sulfenamide | 0.2 | 0.2 | 0.2 | 0 | 0 | 0 | 0 |
| N-cyclohexyl-benzothioazole-2-sulfenamide | 0 | 0 | 0 | 0.5 | 0.5 | 0 | 0 |
| Sodium Thiosulfate Pentahydrate | | | | | | | |
| Nonproductive | 0 | 0 | 1 | 0 | 1 | 0 | 1 |
| Productive | 0 | 1 | 0 | 1 | 0 | 0 | 0 |
| Uncured Stress Strain | | | | | | | |
| Max Elongation | 2256 | 2201 | 2201 | 2201 | 2201 | 2230 | 2199 |
| @ 40% Elong (MPa) | 0.2223 | 0.2445 | 0.2547 | 0.2500 | 0.2588 | 0.2144 | 0.2269 |
| @ 80% Elong (MPa) | 0.2443 | 0.2695 | 0.2892 | 0.2742 | 0.2893 | 0.2395 | 0.2544 |
| @ 120% Elong (MPa) | 0.2390 | 0.2664 | 0.2887 | 0.2690 | 0.2905 | 0.2363 | 0.2558 |
| @ 240% Elong (MPa) | 0.2029 | 0.2289 | 0.2717 | 0.2310 | 0.2774 | 0.2028 | 0.2426 |
| @ 480% Elong (MPa) | 0.1392 | 0.1588 | 0.2282 | 0.1616 | 0.2300 | 0.1402 | 0.1955 |
| Max Stress (MPa) | 0.0258 | 0.0409 | 0.1492 | 0.0396 | 0.1162 | 0.0237 | 0.0830 |
| Rheometer, 150° C., 1° Arc, 100 cpm | | | | | | | |
| T1 pt rise, (min) | 4.9 | 3.5 | 3.6 | 4.1 | 4.1 | 4.9 | 4.1 |
| T25 (min) | 6.2 | 5.7 | 5.4 | 6.2 | 5.7 | 6.1 | 4.9 |
| T90 (min) | 17.8 | 21.1 | 15 | 18.7 | 14.7 | 18 | 12.3 |
| Min Torque (dNm) | 4.9 | 5.8 | 6.3 | 5.9 | 6.4 | 5 | 5.8 |
| Max Torque (dNm) | 13 | 18.3 | 19.1 | 17.9 | 17.7 | 13 | 14.8 |
| Delta Torque (dNm) | 8.1 | 12.5 | 12.8 | 12 | 11.3 | 8 | 9 |
| Final Torque (dNm) | 12.9 | 18.1 | 18.6 | 17.6 | 17.5 | 12.9 | 14.7 |
| Rate (dNm/min) | 0.46 | 0.53 | 0.88 | 0.62 | 0.83 | 0.44 | 0.81 |
| Modulus at 300% Elongation, MPa | 2.52 | 2.89 | 3.15 | 2.69 | 2.98 | 1.62 | 2.17 |
| Tensile Strength, (MPa) | 8.92 | 10 | 10.04 | 9.33 | 9.72 | 7.73 | 9.41 |
| Elongation at Break, (%) | 906 | 870 | 843 | 878 | 851 | 1005 | 977 |

TABLE II-continued

| Sample No. | Control 1 | 2 | 3 | 4 | 5 | Control 6 | 7 |
|---|---|---|---|---|---|---|---|
| Shore A Hardness at room temp | 47.7 | 43.7 | 45.8 | 44.4 | 45 | 42 | 40.9 |
| Shore A Hardness at 100° C. | 32.7 | 35.1 | 35.2 | 33.6 | 33.3 | 25.1 | 28.8 |
| % Rebound at room temp | 12.1 | 13 | 12.8 | 12.5 | 12.3 | 12.1 | 12.4 |
| % Rebound at 100° C. | 47.6 | 53.1 | 53.4 | 50.4 | 51.8 | 44.2 | 48.1 |

Comparison of Control Sample 1 and Sample 2 containing a thiuram disulfide curative, tetramethylthiuram disulfide, shows that T90 cure time is actually extended 18.5 percent when sodium thiosulfate pentahydrate is added to the productive mix stage. Unexpectedly, however, when the same level of sodium thiosulfate pentahydrate is added during the nonproductive mix stage as exemplified in Sample 3, T90 cure time is reduced 15.7 percent. This is a desirable result since cure time reduction can be translated into higher productivity. Another unexpected benefit of adding sodium thiosulfate pentahydrate during the nonproductive mix stage versus during the productive mix stage is illustrated by examination of the uncured stress-strain data of Table II. Uncured stress-strain measurements relate to the green strength of an elastomer with higher resistance to deformation typically defined as having good green strength. In an uncured tire, good green strength in a tire component such as a liner means creep will be minimized and hence excessive distortion before tire molding or tearing during the expansion that occurs upon tire molding will not occur (for a full discussion, see "Tack and Green Strength of Elastomeric Materials," G R Hamid, *Rubber Chemistry & Technology*, 54 (3) 575, 1981). When sodium thiosulfate pentahydrate is added during the productive mix stage of Sample 2, a stress at maximum elongation of 0.0409 MPa is obtained versus 0.1494 Mpa at maximum elongation when sodium thiosulfate pentahydrate is added during the nonproductive mix stage as in Sample 3. This represents a 265 percent increase in green strength. Even more dramatic was an increase of 478 percent in green strength for Sample 3 versus Control Sample 1 where no sodium thiosulfate pentahydrate is present, 0.1492 MPa versus 0.0258 MPa.

Another example which illustrates the benefit of adding sodium thiosulfate pentahydrate to the nonproductive mix stage versus the productive mix stage would compare Sample 4 to Sample 3. In both cases, a sulfenamide curative, N-cyclohexyl-benzothiazole-2-sulfenamide, is used. Again, unexpectedly, for Sample 4, having sodium thiosulfate pentahydrate added in the nonproductive stage, T90 cure time is reduced 21.4 percent versus having it mixed in during the productive mix stage. Likewise, green strength was unexpectedly enhanced 193 percent at maximum elongation for Sample 4 versus Sample 3.

Another example which illustrates the benefit of adding sodium thiosulfate pentahydrate to the nonproductive mix stage would compare Sample 7 to Control Sample 6 which contains no sodium thiosulfate pentahydrate. In both samples, a thiazole curative, mercaptobenzothiazole disulfide, is used. For Sample 7, having sodium thiosulfate pentahydrate added in the nonproductive stage, T90 cure time is reduced 31.7 percent versus not having it mixed in the nonproductive mix stage. Also, green strength was unexpectedly enhanced 250 percent at maximum elongation for Sample 7 versus Control Sample 6.

What is claimed is:

1. A tire having an innerliner compound of
   (A) a halogenated isobutylene rubber and
   (B) from 0.05 to 10 phr of sodium thiosulfate pentahydrate.

* * * * *